United States Patent
MacAdams et al.

(10) Patent No.: US 12,168,729 B2
(45) Date of Patent: Dec. 17, 2024

(54) FLAME-RETARDANT EPOXY COMPOSITION AND METHOD OF USING THE SAME

(71) Applicant: CYTEC INDUSTRIES INC., Princeton, NJ (US)

(72) Inventors: Leonard MacAdams, Woolwich Township, NJ (US); Dalip K. Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 587 days.

(21) Appl. No.: 17/414,132

(22) PCT Filed: Dec. 17, 2019

(86) PCT No.: PCT/US2019/066963
§ 371 (c)(1),
(2) Date: Jun. 15, 2021

(87) PCT Pub. No.: WO2020/131946
PCT Pub. Date: Jun. 25, 2020

(65) Prior Publication Data
US 2022/0081551 A1 Mar. 17, 2022

Related U.S. Application Data

(60) Provisional application No. 62/781,190, filed on Dec. 18, 2018.

(51) Int. Cl.
| | | |
|---|---|---|
| *C08L 63/00* | (2006.01) | |
| *B32B 3/12* | (2006.01) | |
| *C09D 163/00* | (2006.01) | |
| *C09K 21/04* | (2006.01) | |

(52) U.S. Cl.
CPC ............... *C08L 63/00* (2013.01); *B32B 3/12* (2013.01); *C09D 163/00* (2013.01); *C09K 21/04* (2013.01); *B32B 2250/40* (2013.01); *B32B 2255/26* (2013.01); *B32B 2305/024* (2013.01); *C08L 2201/02* (2013.01); *C08L 2205/035* (2013.01)

(58) Field of Classification Search
CPC ....... C08L 63/00; B32B 3/12; B32B 2250/40; C09D 163/00
See application file for complete search history.

(56) References Cited

U.S. PATENT DOCUMENTS

| | | | |
|---|---|---|---|
| 2008/0167412 A1* | 7/2008 | Elgimiabi | ............... C09K 21/02 524/436 |
| 2013/0115442 A1 | 5/2013 | Sang et al. | |
| 2016/0222192 A1 | 8/2016 | Takashima et al. | |
| 2016/0230001 A1* | 8/2016 | Spencer | ................... C08J 5/249 |
| 2017/0182719 A1* | 6/2017 | Sang | ........................ B32B 5/26 |

FOREIGN PATENT DOCUMENTS

| | | |
|---|---|---|
| JP | H06211969 A | 8/1994 |
| WO | 2006071820 A1 | 7/2006 |
| WO | 2010117669 A1 | 10/2010 |
| WO | 2013086063 A2 | 6/2013 |

* cited by examiner

*Primary Examiner* — Nathan T Leong
(74) *Attorney, Agent, or Firm* — Thi Dang

(57) ABSTRACT

A low-density, halogen-free epoxy composition that is flame-resistant upon curing and is suitable for use as a potting compound. The epoxy composition includes: (a) an epoxy component; (b) at least one curative; (c) at least one latent curing accelerator; (d) a toughening component that includes nano-sized core shell rubber (CSR) particles having particle size of less than 1 micron; (e) a fire-retardant component that is halogen-free; and (f) hollow microspheres for reducing the density of the composition. The fire-retardant component includes a mixture of: (i) at least one polyphosphate; (ii) at least one metal borate; and (iii) at least one compound selected from alkaline earth metal hydroxides and aluminum hydroxides.

14 Claims, No Drawings

FLAME-RETARDANT EPOXY COMPOSITION AND METHOD OF USING THE SAME

The instant application is a U.S. national phase entry under 35 U.S.C. § 371 of International Application No. PCT/US2019/066963 filed on Dec. 17, 2019, which claims the benefit of prior U.S. Provisional Application No. 62/781,190 filed on Dec. 18, 2018, the content of each of these applications is incorporated herein by reference in its entirety.

Honeycomb sandwich panels are used in structures such as floors and walls of aircraft interiors to maintain strength and stiffness while minimizing the structures' weight. A honeycomb sandwich panel generally consists of a honeycomb core interposed between two prepreg face sheets. The prepreg face sheets are composed of reinforcing fibers impregnated with a curable resin, e.g., epoxy-based composition. The prepreg face sheets are adhesively laminated to the honeycomb core by applying a film of curable adhesive between each prepreg face sheet and one side of the honeycomb core.

Conventionally, potting compounds are inserted into the core of a honeycomb structure for specific applications to improve structural performance and enhance bonding. Moreover, moisture ingress into the voids of the honeycomb cores may be reduced or effectively eliminated by sealing the exposed edges of the honeycomb core sandwich panel with an edge potting compound, which can be co-cured with the honeycomb core sandwich panel. Often, such potting compounds used for this purpose are referred to as "one-part", that is they are pre-mixed and applied in one step. One-part potting compounds are usually high-viscosity, putty-like compounds. Generally, potting compounds such as these can be applied to composite cell structures manually with a spatula or trowel. Alternatively, such potting compounds may also be applied through a robotic or automated system where the material is pumped and inserted into the honeycomb core.

Epoxy resins are widely used as matrix resins in a variety of applications due to their attractive properties such as high strength and modulus, high adhesion to substrates, good chemical and corrosion resistance, excellent dimensional stability, and electrical properties. In particular, epoxy resins have been used for aerospace applications where they are combined with reinforcement fibers to form composite materials for fabricating aircraft components or as materials for structural film adhesives. One area where epoxy resins have found utility is as potting compounds for filling voids of honeycomb sandwich panels.

Additionally, materials for application in the aerospace industry, for example, aircraft interiors, are typically required to meet certain key requirements imposed by various regulatory agencies. Such requirements are often provided by the original equipment manufacturers (OEMs) of aircraft and are often derived either from federal aviation requirements, such as set forth by the Federal Aviation Administration (FAA) in U.S.A., or by performance characteristics desired by the OEM. The requirements include mechanical performance such as high compressive strength, high flame retardation and low emission of smoke and toxic gases during burning. The requirements for mechanical performance and flame retardation need to be achieved at relatively low weight; therefore, the flame retardant compositions need to be of low density in their cured form. Lastly, processing of said materials in a commercial setting must be possible via conventional processing techniques such as, for example, extrusion.

Traditionally, epoxy-based compositions designed to meet the flammability requirements contain halogen-based flame retardants. Such flame retardant, epoxy-based compositions are known to be hazardous and toxic due to the presence of bromine or other halogens. As such, there is the need for halogen-free compositions that could meet the same flammability requirements as the halogen-based materials. However, achieving the desired flammability properties is difficult without the use of said halogen-based flame retardants, especially for resins composed of aromatic epoxies.

Moreover, it has been found that conventional flame retardant epoxy-based compositions, especially when used as a potting compound for honeycomb core-fill applications, exhibit fine micro-cracks upon curing. Such micro-cracking is a result of internal stresses that form within the epoxy matrix as a result of heating and subsequent cooling in a typical curing cycle. The micro-cracks have a deleterious effect on the performance properties of the cured composite structures containing the honeycomb core. These micro-cracks are often present along the cell walls of the honeycomb core, allowing moisture and water ingression into the core.

Thus, there remains the need for a low density, halogen-free, flame retardant epoxy composition that can be used as a potting compound for honeycomb sandwich panel, and which can resist micro-cracking upon cure so as to improve the moisture resistance of the cured material.

Disclosed herein is a low density, flame-retardant epoxy composition that is free of halogenated species and which can resist micro-cracking upon cure, thereby improving moisture resistance of the cured material and improving the material's overall mechanical performance over time.

Generally, the halogen-free, fire-retardant epoxy composition of the present disclosure comprises:
a) an epoxy component comprising at least one epoxide compound having an epoxide functionality of at least 1,
b) at least one curative (or hardener),
c) at least one accelerator,
d) a toughening component comprising nano-sized core shell rubber (CSR) particles,
e) a fire-retardant component that is halogen-free, and
f) a low-density filler component for reducing the density of the composition.

The relative amounts in weight percentages (wt %) of the components in the epoxy composition, based on the total weight of the composition, may be as follows:
a) 5 to 60 wt %, preferably, 20 to 45 wt %, of an epoxy component,
b) 1 to 50 wt %, preferably, 20 to 30 wt %, of curative(s) in total,
c) 0.5 to 1 wt % of an accelerator,
d) 2 to 40 wt %, preferably, 8 to 18 wt %, of a toughening component,
e) 3 to 50 wt %, preferably, 25 to 40 wt %, of a halogen-free, fire-retardant component, and
f) 5 to 50 wt %, preferably, 15 to 22 wt %, of a low-density filler component.

In some embodiments, the weight percentage of the epoxy component is less than 50 wt % of the total composition, and the weight ratio (e/f) of epoxy component (e) to low-density filler component (f) is 1 to 1.1.

The fire-retardant epoxy compositions disclosed herein can be characterized as having a low density, which enables its use in applications where it is desirable to have light-weight structures. Herein, the term "low density" is defined as a composition which has a weight/volume of 1 g/cm³ or less. Upon curing of the fire-retardant epoxy composition, the cured material possesses a density of less than 0.8 g/cm³, in some embodiments, less than 0.7 g/cm³, or less than 0.6 g/cm³. Such low density is due the high proportion of low-density filler component in the epoxy composition. The density can be measured by casting the epoxy composition into a mold and curing at 250° F. for 60 minutes. The cured samples are removed from the molds and their exact dimensions determined. Each sample is weighed and the density calculated in g/cm³.

The fire-retardant epoxy composition disclosed herein can be referred to as a "one-part" system because it contains a curative (or hardener) therein, thus, it can be cured as is. In contrast to a one-party system, a "two-part" system requires the curative component and the epoxy component to be stored separately and requires mixing at time of use.

The epoxy composition of the present disclosure can be prepared by a number of conventional mixing and blending techniques. For example, the components of the epoxy composition may be added and blended at ambient conditions using standard mixing equipment such as a Ross mixer. The components may be optionally heated or cooled during mixing depending on the properties of the specific composition. Furthermore, vacuum may be pulled on the composition to control the viscosity and density of the composition. Preferably, the epoxy resins are first blended for a set time from 5 to 60 minutes, followed by addition of the rubber additive and curatives. The low-density filler component is generally added as the final ingredient. Mixing is continued until homogeneity is reached.

Epoxy Component

Organic epoxide compounds useful in the fire-retardant epoxy composition are any organic compounds having an oxirane ring that is polymerizable by ring opening. Such epoxide compounds, known in the art as epoxides, may include monomeric and polymeric epoxy compounds and can be aliphatic, aromatic, cycloaliphatic, or heterocyclic. The epoxide compounds can be selected from a broad range of aliphatic and aromatic epoxies having a functionality of one or greater and, more preferably, from two to four. Epoxide compounds which are suitable for the current invention are derived from, but not limited to, bisphenol A, bisphenol F, bisphenol, S, and bisphenol Z epoxy resins. More preferable, the epoxide compounds of the current invention are derived from the diglycidyl ether of bisphenol A, bisphenol F, bisphenol, S, and bisphenol Z.

Particularly suitable are multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), fluorine 4,4'-dihydroxy benzophenone, bisphenol Z (4,4'-cyclohexylidenebisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resins) available from Dow Chemical Co.; triglycidyl ethers of aminophenol, e.g. ARALDITE® MY 0510, MY 0500, MY 0600, MY 0610 from Huntsman Corp.; and Epikote® 158 available from Momentive. Additional examples include phenol-based novolac epoxy resins, commercially available as DEN 428, DEN 431, DEN 438, DEN 439, and DEN 485 from Dow Chemical Co; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX® 556, and TACTIX® 756 from Huntsman Corp.

Curatives and Accelerators

Epoxy hardeners, also known as curing agents, catalysts, or curatives, as disclosed herein are reactive materials capable of reacting either with the epoxy functional group or polymerizing the epoxy functional group. Since the fire-retardant epoxy composition is preferably a one-part system, it contains one or more epoxy hardener(s) capable of accomplishing crosslinking or curing the epoxy resins in the composition when the composition is heated. The hardener as detailed herein may function in a catalytic manner, or, in some embodiments, participate directly in the curing process by reaction with one or more of the epoxy resins. In some embodiments, a combination of two or three hardeners is used.

Specific examples of hardeners that may be used for the fire-retardant epoxy compositions include, but are not limited to, aliphatic and aromatic primary amines, aliphatic and aromatic tertiary amines, boron trifluoride complexes, guanidines, including substituted guanidines, and bisureas. Specific examples include dicyandiamide (DICY), 2,4-Toluene bis-(dimethyl urea) (e.g., CA 150 from CVC Thermoset Specialties), 4,4'-Methylene bis-(phenyl dimethylurea) (e.g. CA 152 from CVC Thermoset Specialties), 3,3'-diaminodiphenylsulfone (3,3-DDS) and 4,4'-diaminodiphenylsulfone (4,4-DDS). One or more curing agents may be present.

In a preferred embodiment, the epoxy hardener is selected from anhydride hardeners such as 4-methyltetrahydroxy phthalic acid anhydride, nadic methyl andyrdride, 5-methyl-2,3-dicarboxynorbornene anhydride, phthalic acid anhydrides, and tetrahydromethylphthalic anhydride.

In order to improve the curing conditions of potting compounds, it is standard to employ accelerators. Accelerators, which may or may not be the same as epoxy hardeners, are typically present in compositions to increase the rate at which the epoxide curing reaction occurs. Examples of such accelerators include, but are not limited to aromatic tertiary amines, imidazoles, imidazole derivatives, imidazole-like compounds and the like. Specific examples include, for example, 2-(2-(2-methylimidazolyl)-ethyl)-4,6-diamino-s-triazine. However, such accelerators have a tendency to deteriorate the latency of the final epoxy composition resulting in a short pot life (or shelf life). In a manufacturing setting, such materials become unusable after a very short period of time.

It has been found that the addition of certain amine adducts as latent curing accelerators to the fire-retardant epoxy composition of the present disclosure can change the cure kinetics and allow for a longer pot life (or shelf life). Such accelerators include amine-epoxy adducts, amine-ureido adducts, and amine-urethane adducts. These amine adducts are solids at and insoluble in the epoxy component at room temperature (21° C.-25° C.). At elevated temperatures, the amine adduct dissolves into the surrounding epoxy resin and functions as an accelerator.

Amine-epoxy adducts can be synthesized by reacting an epoxy compound having more than one epoxy group and a compound having in the molecule both a tertiary amino group and at least one functional group selected from the group consisting of OH, SH, NH, $NH_2$, COOH, and $CONHNH_2$. Such amine-epoxy adduct accelerator is preferred since they have the ability to accelerate the rate of epoxy curing without causing a drop in pot life.

Amine-ureido adducts are prepared by reacting an amine with urea, thiourea or a derivative thereof. For example, amine-ureido adduct may be prepared by reacting an amine with ethylene urea and formaldehyde, and the reaction is carried out in a water-based medium. Amine-urethane adducts are prepared by reacting an amine with an isocyanate, such as n-butyl isocyanate, isopropyl isocyanate, phenyl isocyanate and benzyl isocyanate, including polyfunctional isocyanate compounds such as hexamethylene diisocyanate, toluylene diisocyanate, 1,5-naphthalene diisocyanate, diphenylmethane-4,4'-diisocyanate, isophorone diisocyanate, xylylene diisocyanate, p-phenylene diisocyanate, 1,3,6-hexamethylene triisocyanate and bicycloheptane triisocyanate.

Any amine compound can be used for synthesizing the amine adduct accelerators, including amines having a primary amino group, a secondary amino group or a tertiary amino group. Examples of suitable amine compounds include aliphatic amines such as diethylene triamine, triethylene tetramine, n-propylamine, 2-hydroxyethylaminopropylamine, cyclohexylamine and 4,4'-diaminodicyclohexylmethane; aromatic amine compounds such as 4,4'-diaminodiphenyl-methane, and 2-methylaniline; and nitrogen atom-containing heterocyclic compounds such as 2-ethyl-4-methylimidazole, 2-ethyl-4-methylimidazoline, 2,4-dimethylimidazoline, piperidine and piperazine.

Toughening Component

The fire-retardant epoxy composition of the present disclosure includes a toughening component that includes nano-size core-shell rubber (CSR) particles. The term "nano-sized" as used herein refers to sizes in the nanometer range of less than 1 micron. The toughening component improves the mechanical strength of the cured epoxy matrix derived from curing the epoxy composition. Moreover, it has been found that the presence of such toughening component eliminates the formation of micro-cracks in the cured material, thereby reducing the tendency of the material to absorb moisture.

In preferred embodiments, the toughening component further includes an elastomeric material (or elastomer). A synergistic effect is produced by the combination of the nano-size CSR particles and the elastomeric material. The nano-size CSR particles function to toughen the brittle cured epoxy matrix by de-bonding from the matrix, followed by large scale plastic void growth accompanied by shear band yielding. The elastomeric material functions to efficiently transfer stress between the CSR particles and the matrix.

The toughening component, which includes nano-sized CSR particles and the elastomeric material, is present in an amount within the range of 8 wt % to 18 wt % of the total epoxy composition. The term "wt %" refers to percentage by weight. In some embodiments, the weight ratio (A/B) of CSR particles (A) to elastomeric material (B) in the toughening component is 1 to 2, preferably 1 to 1.5.

The particle size of the nano-sized CSR particles may be in the range from 10 nm to 300 nm as determined by laser scattering technique using a laser scattering particle size distribution analyzer. The CSR particles may have a soft core comprised of a polymeric material having elastomeric or rubbery properties (i.e., a glass transition temperature ($T_g$) less than about 0° C., e.g., less than about −30° C.) surrounded by a hard shell comprised of a non-elastomeric polymeric material (i.e., a thermoplastic or thermoset/cross-linked polymer having a $T_g$ of greater than ambient temperatures, e.g., greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane).

The CSR particle may be comprised of more than two layers (e.g., a central core of one elastomeric material may be surrounded by a second core of a different elastomeric material or the core may be surrounded by two shells of different composition or the particle may have the structure of soft core/hard shell/soft shell/hard shell). Typically, the core comprises from about 50% to about 95% by weight of the particle while the shell comprises from about 5% to about 50% by weight of the particle. The CSR particles may be pre-dispersed in a liquid resin matrix system such as those available from Kaneka Texas Corporation under the trademarks Kane Ace™ MX. It is preferred that the core-shell rubber particles are pre-dispersed in one of difunctional, trifunctional and tetrafunctional epoxy resins to be used in the resinous part (A). As examples, suitable resin matrix systems containing CSR particles include MX 120 (liquid Bisphenol A epoxy with about 25 wt. % CSR), MX 125 (liquid Bisphenol A epoxy with about 25 wt. % CSR), MX 153 (liquid Bisphenol A epoxy with about 33 wt. % CSR), MX 156 (liquid Bisphenol A epoxy with about 25 wt. % CSR), MX 130 (liquid Bisphenol F epoxy with about 25 wt. % CSR), MX 136 (liquid Bisphenol F epoxy with about 25 wt. % CSR), MX 257 (liquid Bisphenol A epoxy with about 37 wt. % CSR), MX 416 and MX 451 (liquid multifunctional epoxy with about 25 wt. % CSR), MX 215 (Epoxidized Phenol Novolac with about 25 wt. % CSR), and MX 551 (cycloaliphatic epoxy with about 25 wt. % CSR).

The elastomers to be used in the toughening component include, without limitation, natural rubber, styrene butadiene, polyisoprene, polyisobutylene, polybutadiene, isoprene-butadiene copolymer, neoprene, butyl nitrile, polysulfide elastomer, acrylic elastomer, acrylonitrile elastomers, silicone rubber, polysiloxanes, polyester rubber, diisocyanate-linked condensation elastomer, ethylene-propylene diene rubbers (EPDM), chlorosulphonated polyethylene, fluorinated hydrocarbons and the like. In some embodiments, the elastomer is selected from liquid elastomers such as amine-terminated butadiene acrylonitrile (ATBN), carboxyl-terminated butadiene acrylonitrile (CTBN), and carboxyl-terminated butadiene (CTB).

Also suitable are epoxy-elastomer adducts. Generally, an elastomer and an epoxy resin are mixed, e.g. in a high shear mixer, to form an adduct as a substantially homogeneous mixture. The elastomer for the adduct may be selected from the elastomers disclosed previously. In one embodiment, the epoxy-elastomer adduct is a reaction product of an epoxy resin, a bisphenol, and a liquid elastomeric polymer (in liquid form at room temperature, 20° C.-25° C.). Suitable liquid elastomers for forming the adduct include those mentioned previously, particularly, ATBN, CTBN, and CTB.

The toughening component may include, as an option, a thermoplastic polymer. Suitable thermoplastic polymers include amorphous polysulfones, i.e., those polymers that contain predominately ether and sulfone groups interspersed between arylene residues. Such polysulfones include polyethersulfones (PES). Polysulfones containing ether and alkylene groups in addition to sulfone groups are predominately amorphous, and are suitable for the purpose herein. Also suitable is a polyethersulfone-polyetherethersulfone (PES-PEES) copolymer having amine terminal groups as described in U.S. Pat. No. 7,084,213. Such copolymer has a $T_g$ above 150° C., for example, 180° C.-200° C. If present, the proportion of thermoplastic (TP) relative to CSR and elastomer combined (or TP/(CSR+elastomer)) is 0.133 to 0.333.

The glass transition temperature ($T_g$) disclosed herein is measured by Differential Scanning calorimetry (DSC) at ramp rate of 5° C./min Flame-Retardant Component The halogen-free, flame retardant component includes a mixture of:
1) at least one polymeric phosphorous-based flame retardant material;
2) at least one compound selected from the group comprising metal borates; and
3) at least one compound selected from the group comprising alkaline earth metal hydroxides and aluminium group hydroxides.

Suitable polymeric phosphorous-based materials, or polyphosphates, may be comprised of cyclic or linear chains with polymeric oxyanions formed from tetrahedral phosphate structural units linked together by sharing oxygen atoms. The term "phosphorous-based" as used in this context means containing phosphorus. Examples of such polyphosphate materials include, but are not limited to, melamine polyphosphate, ammonium polyphosphate, and metal salts of polyphosphates such as sodium polyphosphate, calcium polyphosphate, and potassium polyphosphate. Polyphosphate is present in the epoxy composition in an amount ranging from 3% to 12% by weight, preferably 6% to 8%, of the total weight of the epoxy composition.

The use of elemental red phosphorous to produce flame retardant materials is known. However, the use of elemental red phosphorous does raise health and environmental concerns stemming from the flammability and reactive nature of red phosphorous towards oxidizing agents. Thus, it would be beneficial to preclude its use in industries such as aerospace where the generation of toxic fumes is of concern. Although flammable, red phosphorous when combined with other synergist flame retardants offers exceptional flame retardant properties and often the exclusion of red phosphorous from flame retardant composition, especially epoxy based compositions, results in a loss of non-burning properties. It has been discovered that the use of a polyphosphate (a polymeric material) in combination with other flame retardant compounds offers flame retardant properties similar to or better than red phosphorous-based systems. Furthermore, the polyphosphate offers a distinct advantage over non-polymeric phosphorous materials in terms of non-burning properties. It has been found that the use of a polyphosphate such as melamine polyphosphate, yielded improved resistance to flame propagation and also yielded a material with a lower propensity to generate smoke. Moreover, it was discovered that melamine polyphosphate behaves differently from melamine phosphate.

The metal borate in the flame-retardant component may include, but is not limited to, zinc borate, aluminum borate, magnesium borate, and mixtures thereof. In a preferred embodiment, zinc borate is used. The metal borate is present in the epoxy composition in an amount ranging from about 0.1% to about 15% by weight of the total weight of the epoxy composition. In a preferred embodiment, the metal borate is present in an amount ranging from 1% to 10% by weight of the total weight of the epoxy composition.

The alkaline earth metal hydroxides and aluminium group hydroxides, include, but are not limited to, aluminum trihydrate and magnesium hydroxide. Generally, the metal hydroxide is present in an amount ranging from 1% to 20% by weight, preferably ranging from 5% to 20% by weight, or 10% to 20% by weight, of the total weight of the composition.

Low-Density Filler Component

The low-density filler component of the flame retardant epoxy composition is selected from hollow inorganic microspheres or micro-balloons. The microspheres are small, spherical, hollow bodies. Each micro-sphere consists of an outer shell enclosing a hollow core. Microspheres are commercially available in a range of diameters of several hundred micrometers and less, with wall thicknesses of about 1% micrometers. Preferably, the range of diameters used in the current flame retardant composition is from 5 to 150 microns. The microspheres may be made from various materials, including glass, silica ($SiO_2$), zirconia, ceramic, and carbon. A suitable coupling agent such as a functionally substituted siloxane (e.g., Z-6020 and Z-6040 from Dow Corning) can be applied to coat the micro-balloon surface to enhance its properties. As an example, silica microspheres available from Trelleborg under the trademark Eccospheres® are suitable for the purpose disclosed herein.

The microspheres suitable for the purpose herein exhibit a density of less than 0.5 g/cm$^3$, in some embodiments, in the range of 0.1 to 0.4 g/cm$^3$ or 0.1 to 0.3 g/cm$^3$. The particle size of the microspheres can range from 1 μm to 300 μm, and in some embodiments, in the range of 40 μm-60 μm. Microspheres particle size measurements can be performed by analyzing a statistically significant sample of microspheres under optical microscope or a scanning electron microscope (SEM).

The density of the flame-retardant epoxy composition may be lowered further by the addition of a second type of low-density hollow microspheres, which has a density that is lower than the first type of low-density hollow microspheres. The density of the second type of low-density hollow microspheres is within the range of 0.01-0.03 g/cm$^3$.

The particle size of the second type of low-density hollow microspheres may be in the range of 20 μm-100 μm, and preferably, 35 μm-55 μm.

In some embodiments, the microspheres (in total) are present in amount of 15% to 25% by weight of the total epoxy composition.

Properties and Applications

The fire-retardant, halogen-free, epoxy composition of the present disclosure can be characterized as having a desirable process-ability in that it can be processed via extrusion due to its low initial viscosity as well as minimal viscosity increase over time. Viscosity increase can limit the shelf life and usage of the fire-resistant composition. The initial extrusion rate, defined as the extrusion rate of a material immediately after it is made, can decrease significantly over time, which limits the shelf-life and processing ability of the material. For example, it is common for epoxy compositions to exhibit a lower extrusion rate after one or two days following their formulation. The fire-retardant epoxy composition of the present disclosure exhibits an extrusion rate of greater than 100 g/min initially after mixing of components and maintains that rate for up to 8 days thereafter.

Due to its excellent processing characteristics, the fire-retardant epoxy composition of the present disclosure may be supplied and/or used in a variety of different forms including, but not limited to paste, film, viscous resin, etc.

The fire-resistant epoxy composition of the present disclosure is thermally curable, i.e., upon heating the composition undergoes curing. Cure conditions can vary depending on application and also on the selection of curing agents used in the composition. In some embodiments, the epoxy composition is curable at a temperature within the range of 100° C. to 180° C. for curing cycle varying from 5 minutes to 240 minutes.

In some embodiments, the hardened material, obtained by thermal curing of the fire-resistant epoxy composition, exhibits well balanced properties characterized by fire-retardation, including; low smoke generation and low burn times. Such cured material also emits little to no toxic gases during burning. For example, the hardened, cured material can provide the following:

1. a flaming smoke density of less than 100 after 90 seconds and less than 200 after 240 seconds;
2. a burn length of less than 152 mm in a 60 second vertical burn test;
3. a flame time of less than 15 sec in a 60 second vertical burn test; and
4. a drip flame time of less than 3 seconds.

In some embodiments, the cured material has a compressive strength of at least 2500 psi (17.2 MPa), for example, 2500 psi to 5000 psi (17.2 MPa to 34.5 MPa) at room temperature (20° C.-25° C.). Such compressive strength is determined in accordance with ASTM D 695. It has been discovered that the addition of the toughening component disclosed herein (particularly, the combination of CSR particles and elastomeric material) can increase the compressive strength of the resulting composition. The presence of such toughening component provides resistance to microcracking under compressive forces that occur throughout the life cycle of, for example, a structural part which encounters constant loads and forces during use.

Due to its low density, the fire-resistant epoxy composition of the present disclosure is suitable for use in structural parts where it is desirable to have lightweight structures. This composition is particularly useful in aerospace applications, for example, as materials for aircraft interiors and, in general, for bonding, sealing and/or insulating parts. A particularly suitable application is its use as a potting compound for filling in one or more voids in the honeycomb core of the sandwich panel, such as sealing the edges of in honeycomb sandwich panels, or to repair a damaged area within the panel. Damage to the sandwich panel can be repaired by application of the potting compound into the honeycomb core at the damaged area. Application of the potting compound can be carried by conventional techniques such as injection, coating, or troweling.

What is claimed is:

1. A method for filling voids in a honeycomb sandwich panel, comprising:
   providing a honeycomb sandwich panel comprising a honeycomb core disposed between two sheets of composite materials, said honeycomb core comprising one or more voids to be filled with a potting composition;
   introducing a potting composition into the one or more voids of the honeycomb core;
   curing the honeycomb sandwich panel with the potting composition,
   wherein the potting composition is a halogen-free, curable epoxy composition comprising:
   a) an epoxy component comprising at least one epoxide compound having an epoxide functionality of at least 1;
   b) at least one curative;
   c) at least one latent curing accelerator;
   d) a toughening component comprising nano-sized core shell rubber (CSR) particles having particle size of less than 1 micron;
   e) a fire-retardant component that is halogen-free; and
   f) hollow microspheres for reducing the density of the composition;
   wherein the latent curing accelerator is selected from amine-epoxy adducts, amine-ureido adducts, and amine-urethane adducts, which are insoluble in the epoxy component at room temperature in the range of 21° C. to 25° C.,
   wherein the fire-retardant component comprises a mixture of: (i) at least one polyphosphate; (ii) at least one metal borate; and (iii) at least one compound selected from alkaline earth metal hydroxides and aluminum hydroxides, and
   wherein, after curing, the cured potting composition possesses a density of less than 0.8 g/cm$^3$.

2. The method of claim 1, wherein the toughening component further comprises an additional elastomeric material.

3. The method of claim 2, wherein the additional elastomeric material is selected from: natural rubber, styrene butadiene, polyisoprene, polyisobutylene, polybutadiene, isoprene-butadiene copolymer, neoprene, butyl nitrile, polysulfide elastomer, acrylic elastomer, acrylonitrile elastomers, silicone rubber, polysiloxanes, polyester rubber, diisocyanate-linked condensation elastomer, ethylene-propylene diene rubbers (EPDM), chlorosulphonated polyethylene, fluorinated hydrocarbons, and combinations thereof.

4. The method of claim 2, wherein the additional elastomeric material is selected from amine-terminated butadiene acrylonitrile (ATBN), carboxyl-terminated butadiene acrylonitrile (CTBN), and carboxyl-terminated butadiene (CTB).

5. The method of claim 2, wherein the additional elastomeric material is an epoxy-elastomer adduct.

6. The method of claim 1, wherein the toughening component further comprises a thermoplastic polymer.

7. The method of claim 6, wherein the thermoplastic polymer is selected from amorphous polysulfones.

8. The method of claim 6, wherein the thermoplastic polymer is a polyethersulfone-polyetherethersulfone (PES-PEES) copolymer.

9. The method of claim 1, wherein the toughening component further comprises an additional elastomeric material and a thermoplastic polymer.

10. The method of claim 1, wherein the latent curing accelerator is an amine-epoxy adduct formed by reacting an epoxy compound having more than one epoxy group with a compound having a tertiary amino group and at least one functional group selected from the group consisting of OH, SH, NH, $NH_2$, COOH, and $CONHNH_2$.

11. The method of claim 1, wherein the nano-sized CSR particles have particle size in the range from 10 nm to 300 nm as determined by laser scattering technique.

12. The method of claim 1, wherein the hollow microspheres comprise microspheres having different densities.

13. The method of claim 12, wherein a portion of the hollow microspheres has a density in the range of 0.1-0.4 $g/cm_3$ and another portion of the hollow microspheres has a density in the range of 0.01-0.03 $g/cm_3$.

14. The method of claim 1, wherein the potting composition comprises, in weight percentages (wt %) based on the total weight of composition:
   a) 5 to 60 wt % of epoxy component,
   b) 1 to 50 wt % of curative(s) in total,
   c) 0.5 to 1 wt % of latent curing accelerator,
   d) 2 to 40 wt % of toughening component,
   e) 3 to 50 wt % of fire-retardant component, and
   f) 5 to 50 wt % of hollow microspheres.

* * * * *